United States Patent [19]

Davis

[11] 4,428,351
[45] Jan. 31, 1984

[54] FUEL PROCESSOR APPARATUS

[75] Inventor: Leland L. Davis, Saline, Mich.

[73] Assignee: Davco, Inc., Ann Arbor, Mich.

[21] Appl. No.: 287,149

[22] Filed: Jul. 27, 1981

Related U.S. Application Data

[63] Continuation-in-part of Ser. No. 188,875, Sep. 19, 1980, Pat. No. 4,368,716.

[51] Int. Cl.³ .......................................... F02M 31/00
[52] U.S. Cl. ................................. 123/557; 210/184
[58] Field of Search ................ 123/557; 210/180, 181, 210/184, 182, 183, 186, 185; 165/51, 52

[56] References Cited

U.S. PATENT DOCUMENTS

| | | | |
|---|---|---|---|
| 2,068,395 | 1/1937 | Burckhalter | 210/181 |
| 2,377,988 | 1/1945 | Braun | 210/184 |
| 3,616,885 | 11/1971 | Priest | 210/184 |
| 4,091,265 | 5/1978 | Richards | 210/184 |
| 4,354,946 | 10/1982 | Warlick | 210/184 |

FOREIGN PATENT DOCUMENTS

| | | | |
|---|---|---|---|
| 493157 | 8/1953 | Canada | 210/184 |
| 513329 | 2/1955 | Italy | 210/184 |

Primary Examiner—Ronald H. Lazarus
Attorney, Agent, or Firm—Harness, Dickey & Pierce

[57] ABSTRACT

A processor for diesel engine fuel has a combined heating and sediment chamber surmounted by a filtering unit to which the fuel flows from said chamber. Heating means contained in the chamber has a part in close proximity to an inlet passage which leads from the chamber to the filtering unit. The filtering unit includes filtering means removably carried by an upper portion of the processor. A modified construction has a transparent bottom section which may be of variant length depending upon the desired capacity of the unit.

12 Claims, 7 Drawing Figures

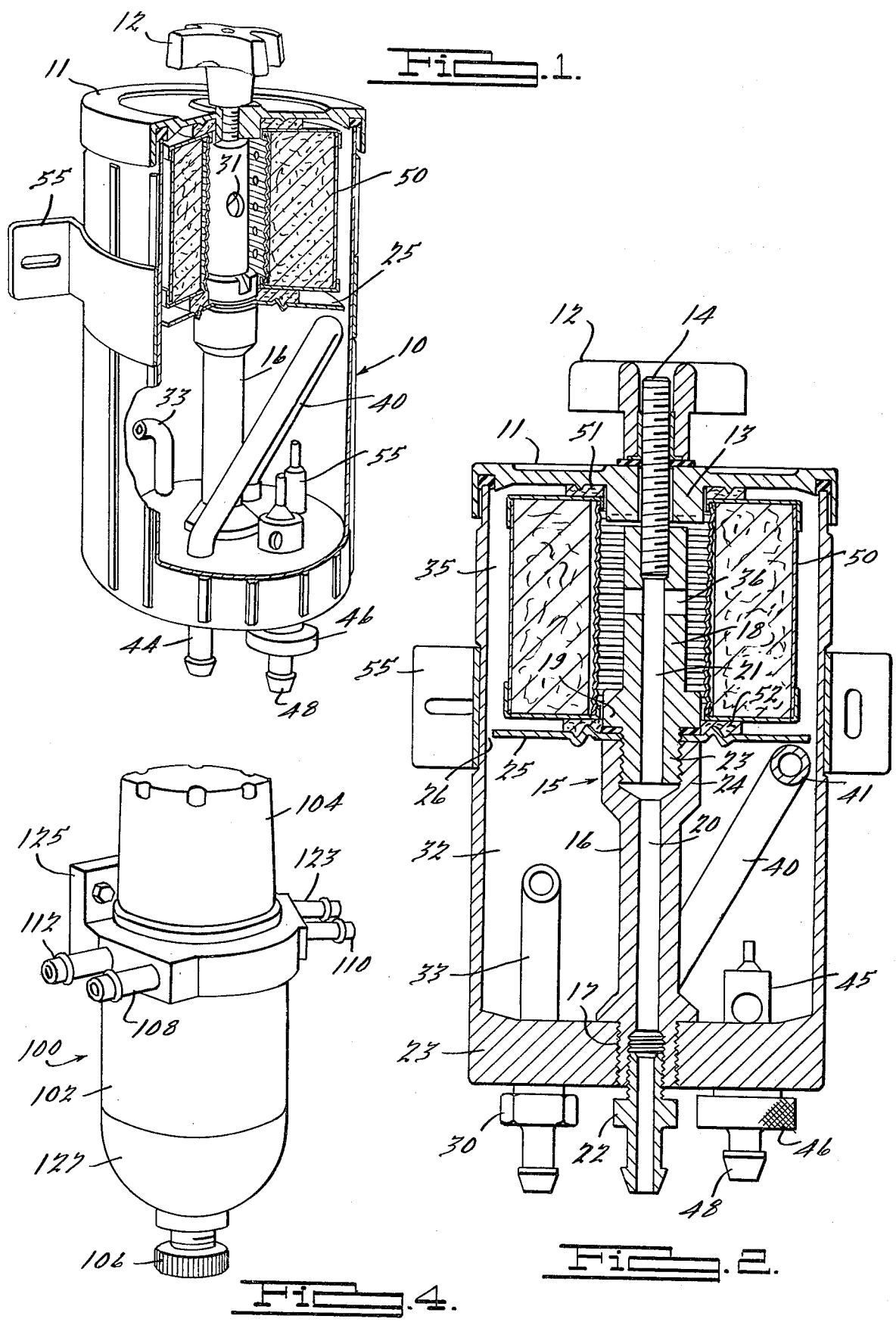

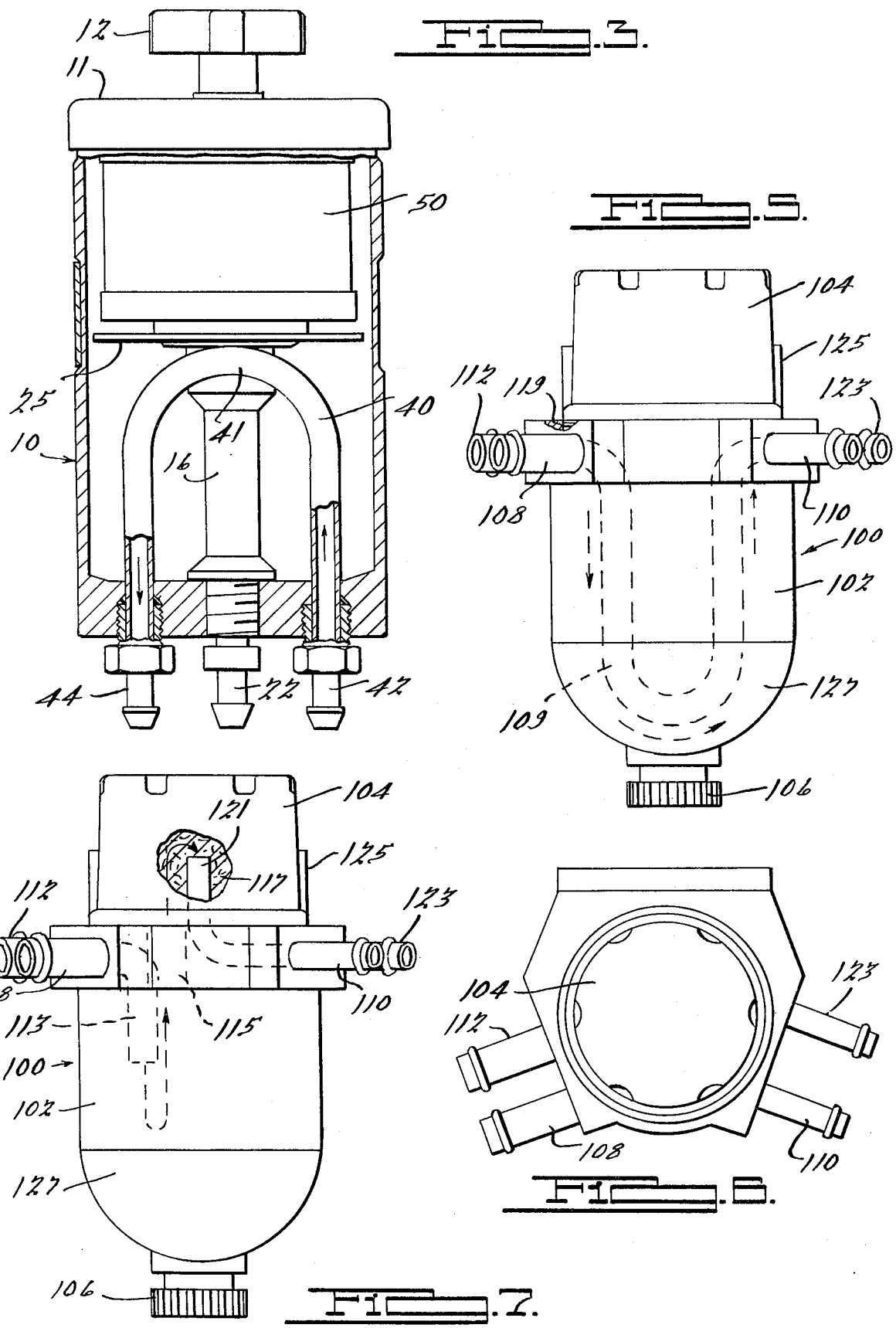

FUEL PROCESSOR APPARATUS

REFERENCE TO RELATED APPLICATION

This application is a continuation-in-part of application Ser. No. 188,875, now U.S. Pat. No. 4,368,716 issued Jan. 18, 1983 to L. L. Davis filed Sept. 19, 1980.

BACKGROUND OF THE INVENTION

This invention relates to fuel processing apparatus for diesel engines. In recent years the quality of available diesel fuel has deteriorated, due to several factors, and the presence of water, waxes, heavier components and particulate materials has created problems in engine operation and starting. Some of these problems are particularly severe where the engine must be operated intermittently in low ambient temperatures.

An important object of the invention is to provide an improved unitary fuel processor assembly which is effective not only to provide a desired degree of heating of the fuel from a waste heat source, but which also incorporates a readily replaceable built-in filter element in heat conductive communication with heated portions of the apparatus, thereby reducing the tendency of wax crystals to plug the filter element.

A related object is to provide such an improved fuel processor assembly wherein the fuel filter element may be of either the spin-on or the drop-in type.

A further object is to provide such an improved fuel processing device having a transparent bottom portion which functions as a sediment bowl for water and particulate material, and which is interchangeable with transparent sections of different lengths to vary the capacity of the unit as may be desired to adapt the unit for engines of varying rates of fuel consumption.

Other objects and advantages will become apparent upon consideration of the present disclosure in its entirety.

BRIEF DESCRIPTION OF THE FIGURES OF DRAWING

FIG. 1 is a perspective view of a fuel processing device constructed in accordance with the present invention, partly broken away;

FIG. 2 is a vertical diametric sectional view thereof;

FIG. 3 is a vertical diametric sectional elevational view taken at 90° to FIG. 2;

FIG. 4 is a perspective view of a fuel processing device of a modified construction;

FIG. 5 is a front elevational view of the embodiment of FIG. 4;

FIG. 6 is a top plan view thereof; and

FIG. 7 is a somewhat diagrammatic front elevational view thereof, partly broken away.

DETAILED DESCRIPTION OF PREFERRED FORMS OF THE INVENTION

Reference character 10 designates generally an open topped cylindrical fluid-tight canister to which a gasketed fluid-tight cover 11 is removably clampingly secured by means of the wing nut 12. A two-part tubular support and conduit assembly generally designated 15 is positioned axially in the canister, having a bottom section 16 threadedly rigidly secured in and upstanding from a suitably tapped opening 17 in the bottom wall 23 of the canister and having an upper section 18 rigidly threadedly attached to the lower section 16. The interiors of the tubular sections 16, 18 communicate to define an axial passage 20 which communicates with the exterior via a fitting 22 to which a fuel outlet conduit (not shown) is adapted to be attached. The threadably interfitted male and female portions 23, 24, respectively, of the upper and lower sections 18, 16 serve as means for rigidly supporting a combined baffle and filter supporting plate 25 clamped therebetween and which is of a diameter slightly less than the inside diameter of the canister, thereby providing a relatively narrow annular slot 26 for a purpose which will presently be described.

The upper end of the section 18 is tapped to threadedly receive the stud 14 for the wing nut 12 and provide a firm support for attachment of the cover 11.

A fuel inlet fitting 30 attached to and extending through the bottom wall 23 of the canister is adapted to deliver fuel to the chamber portion 32 below the partition 25. An inlet pipe 33 connected to the fitting 30 extends upwardly within the chamber 32 and is bent tangentially at its top to impart a rotary motion to the fuel in the chamber.

The fuel flows upwardly from chamber 32 through the gap or slot 26 into the chamber 35 above the partition 25, and after passing inwardly through the filter, enters the upper passage portion 21 of passage 20, in the upper support tube section 18, via radial holes 36, whence it is conducted downwardly through passage 20 and out through the fuel discharge fitting 22, from which it is conducted to the fuel inlet of the engine.

A heating element is provided in the chamber 32 and is shown as a tube 40, bent to inverted U form, having its lower ends in communication with inlet and outlet fittings 42, 44 for a heating fluid. Fittings 42, 44 are supported in the bottom wall of the canister, fitting 42 being adapted to be connected to the pressure side of a source of heating fluid such as the engine cooling fluid circulating system, and fitting 44 to the return side of the cooling system. Although of course optional, this is often most conveniently done in automotive installations by connecting the fittings 42, 44 to the inlet and outlet sides respectively of the cab or passenger compartment heater hoses.

It is to be noted that the upper end of the heater tube 40 extends to a position close to the gap 26 through which the fuel flows to the filter section 35. If a different type of heating unit is employed, such as an electrical heater (which, as will be recognized, is readily substitutable in the preferred structure), it also projects upwardly from the bottom wall to a position close to the gap 26 so that its end is positioned comparably to the bight portion 41 of the heater tube 40. As best shown in FIG. 2, such upper portion of the heater element is slightly spaced both from the partition 25 and from the inner wall of the canister 10. Thus when the engine is started, the fuel flowing through the portion of the gap 26 close to the upper end of the heater is warmed very quickly. This is important in cold weather, inasmuch as wax crystals which have formed in the cold fuel tend to immediately commence clogging the filter. Only a small amount of heat is needed to melt such wax crystals, but initially there is insufficient heat to heat all the fuel adequately to melt the crystals. With this construction, the portion of the fuel which flows through the gap 26 at a position close to the upper portion 41 of the heater is sufficiently heated quickly enough to maintain a clear, wax-free path through the filter until more heat is available to heat the fuel in the main tank via the return line (not shown) which is in normal practice connected to the outlet line from fitting 22. When the fuel in the entire fuel chamber 32 is warmed, it of course flows upwardly through the entire annular gap.

A water sensing element may also be installed in the bottom wall of the canister, as indicated at 55. Such elements, which are designed to activate a warning light when water has accumulated to a predetermined level in the chamber, are known and commercially available, and such feature does not constitute a part of the present invention.

The bottom wall of the canister also supports a drain valve of a known type, generally designated 45, having an operating knob 46 by which it may be opened and closed when desired, and equipped also with a fitting portion 48 to which a drain hose may be attached if necessary.

The filter cartridge 50 may, as shown, be of a known commercially available cylindrical drop-in type, supported and clamped between the cover and the partition 25, on suitable hub portions as 13, 19 projecting from the cover and from the upper tube section 18, respectively, suitable gasketing being provided as indicated at 51, 52.

The unit is adapted to be mounted by means of a conventional bracket 55 at a position where the upper portion is readily accessible so that when desired the cover 11 can be removed and the filter cartridge 50 replaced.

There now follows a description of the embodiment of the invention shown in FIGS. 4–7, wherein the fuel processor apparatus includes a built-in integral fuel filter. In the embodiment of FIGS. 4–7 the fuel processor apparatus 100 is constructed in the form of a generally elongated cylindrical vessel 102 which has an integral filter member 104 at the top thereof and a drain plug 106 at the bottom thereof. Hot coolant liquid (e.g., from the heater return water line circuit) is introduced to the vessel 102 through an inlet line 108 from which it assumes the flow path through the vessel 102 to pass through the interior of the vessel by means of flow through conduit 109, and subsequently it passes to the cooling fluid outlet conduit 110.

Cold or unprocessed diesel fuel from the fuel tank is introduced to the apparatus 100 via the fuel inlet line 112 from which it passes into the interior of the vessel 102 by means of the conduit 113. The diesel fuel passing through the internal portion of the vessel 102 is heated by the hot coolant liquid passing through the conduit 109. Due to the heat exchange action which takes place within the vessel 102 and also due to the significant difference between the specific heat of the fuel oil and the specific heat of the water contained therein, the suspended water (as well as any ice crystals suspended in the fuel) are separated out of the fuel and settle to the bottom of the vessel 102 in a fashion similar to the operation of the embodiment of FIGS. 1–3. The processed fuel then passes out of the vessel 102 by means of the conduit or passageway 115 which introduces the fuel to the filter element 104, which includes a filtering material designated 117. The filtration material 117 operates to remove particulate material from the fuel.

The filter element 104 is a spin-on type of filter (or it could be a drop-in type filter) which is integrally connected to the apparatus 100 by means of a threaded connection 119. After the fuel has passed through the filtration material 117 the fuel exits from the filter via the conduit 121 and the fuel outlet conduit 123.

It will be noted that the inlet passage 115 from the bottom chamber to the filter is close to the heating tube 109 at a position near the inlet of the latter. Thus the fuel entering the filter is quickly heated, to effectively prevent paraffin wax blockage, in a manner analogous to the first embodiment.

Additional features which are present in this embodiment and particularly as shown in FIG. 3 are that the bottom of the vessel 102 may suitably include a transparent or see-through section designated 127 so that the collected water can be observed at the bottom of the vessel 102, thus facilitating removal of the water at periodic intervals. In addition, the lower length of the vessel 102 can be extended to make the overall fuel processor apparatus 100 of variable capacity depending upon the fuel requirements of the engine. A bracket means 125 can be used to suitably mount the fuel processor apparatus 100 at any sturdy convenient location.

This detailed description of preferred forms of the invention, and the accompanying drawings, have been furnished in compliance with the statutory requirement to set forth the best mode contemplated by the inventors of carrying out the invention. The prior portions consisting of the "Abstract of the Disclosure" and the "Background of the Invention" are furnished without prejudice to comply with administrative requirements of the Patent and Trademark Office.

While it will be apparent that the preferred embodiments of the invention disclosed are well calculated to fulfill the objects above stated, it will be apparent that the invention will be susceptible to modification, variation and change without departing from the proper scope or fair meaning of the subjoined claims.

I claim:

1. A unitary processing and filtering unit, particularly for diesel fuel and operative to separate out water-impurities from the fuel, comprising a housing including a lower portion defining a combined heating and sediment chamber having a fuel inlet, a concentric annular shaped filtering means carried by an upper portion of said housing and having a fuel outlet, and means defining a passage for conducting fluid from said chamber to the filtering means, characterized by heating means in said lower portion operative to heat the incoming fuel by direct contact therewith in said chamber, said heating means including a heated portion in close proximity to said passage, and said heating means extends through a substantial part of the lower portion.

2. A unit as defined in claim 1 wherein, a partition separates the upper and lower portions, and the heating means is below the partition.

3. A unit as defined in claim 1 further characterized in that the housing is of substantially cylindrical form, said filtering means being located in an upper chamber defined by an upper portion of said housing, a partition between said chambers in said housing, said passage providing a restricted area of communication between said chambers, said heating means including an elongated heatable element extending through said first-mentioned chamber toward said passage.

4. A unit as defined in claim 3 wherein said heatable element extends upwardly through said first-mentioned chamber at an angle to the axis of the cylinder defined by said housing.

5. A unit as defined in claim 4 further characterized in that said partition is a substantially circular plate of slightly lesser diameter than the interior of the housing, thereby providing between the plate and housing a restricted gap which constitutes said passage, said heatable element extending to a position close to, but spaced from, both said plate and the inner wall of the housing.

6. A unit as defined in claim 3 wherein said filtering means is supported on said partition, and the heating means is below the partition.

7. A unit as defined in claim 6 wherein said housing includes a removable fluid-tight top cover, said filtering means comprising a removable filtering element clamped between said cover and partition.

8. A unit as defined in claim 1 wherein said heating means comprises an inverted U-tube extending angularly upwardly through said chamber and having a bight area defining said heated portion in close proximity to the passage.

9. A unit as defined in claim 1 wherein said chamber has a partly spherical bowl-shaped bottom portion, said heating means comprising a U-tube depending into said bowl-shaped bottom portion, said U-tube having an inlet portion located close to said passage and defining said heated portion.

10. A unit as defined in claim 1 further characterized in that the filtering means comprises an assembly separably threadedly secured to the top of and communicating with the interior of said housing.

11. A unit as defined in claim 9 wherein said bottom portion is transparent.

12. A unit as defined in claim 9 wherein said bottom portion is a separate transparent part.

* * * * *